(12) United States Patent
Pritchard et al.

(10) Patent No.: US 10,851,846 B2
(45) Date of Patent: Dec. 1, 2020

(54) POWER TRANSMITTING COMPONENT WITH A LUBRICATION DISTRIBUTION VALVE HOUSED IN A CLUTCH HUB OF A FRICTION CLUTCH AND AN ACTUATOR FOR COORDINATED OPERATION OF THE FRICTION CLUTCH AND THE LUBRICATION DISTRIBUTION VALVE

(71) Applicant: BorgWarner Inc., Auburn Hills, MI (US)

(72) Inventors: Larry A. Pritchard, Macomb, MI (US); Christopher Sullivan, Rochester Hills, MI (US); Aaron Stinson, Metamora, MI (US)

(73) Assignee: BorgWarner Inc., Auburn Hills, MI (US)

( * ) Notice: Subject to any disclaimer, the term of this patent is extended or adjusted under 35 U.S.C. 154(b) by 148 days.

(21) Appl. No.: 16/275,388

(22) Filed: Feb. 14, 2019

(65) Prior Publication Data
US 2019/0277346 A1    Sep. 12, 2019

Related U.S. Application Data

(60) Provisional application No. 62/640,679, filed on Mar. 9, 2018.

(51) Int. Cl.
*F16D 13/74*   (2006.01)
*F16D 13/52*   (2006.01)
*F16D 27/115*  (2006.01)
*F16D 23/12*   (2006.01)
*F16H 57/04*   (2010.01)
*B60K 17/344*  (2006.01)
*B60K 17/346*  (2006.01)

(52) U.S. Cl.
CPC ............ *F16D 13/74* (2013.01); *B60K 17/344* (2013.01); *B60K 17/3467* (2013.01); *F16D 13/52* (2013.01); *F16D 27/115* (2013.01); *F16D 2023/123* (2013.01); *F16H 57/0473* (2013.01)

(58) Field of Classification Search
CPC .... F16D 13/74; F16D 13/52; F16D 2023/123; F16D 27/108–115; F16H 57/0473
See application file for complete search history.

(56) References Cited

U.S. PATENT DOCUMENTS 7,004,873 B2 *  2/2006  Puiu ................... B60K 17/3462
                                                    475/145
8,256,559 B2 *  9/2012  Kato ....................... F16D 13/69
                                                    180/248

(Continued)

*Primary Examiner* — Ernesto A Suarez
*Assistant Examiner* — James J Taylor, II
(74) *Attorney, Agent, or Firm* — Burris Law, PLLC

(57) ABSTRACT

A power transmitting component that includes a clutch, a valve and a ball ramp mechanism. The clutch has a hub, a housing, a clutch pack and an apply plate. The clutch pack has sets of friction plates that are mounted to the hub and the housing. The valve includes a valve element, which is received in a bore in the hub, an inlet and an outlet. The ball ramp mechanism has first and second ball ramp rings and is operable for selectively translating the apply plate to compress the friction plates against the housing as well as for translating the valve element to open the valve. The second ball ramp ring is coupled to the hub for rotation therewith. The first ball ramp ring is rotatable relative to the second ball ramp ring.

10 Claims, 6 Drawing Sheets

(56) References Cited

U.S. PATENT DOCUMENTS

| | | | |
|---|---|---|---|
| 8,910,766 B2 * | 12/2014 | Kriebernegg | F16D 13/52 |
| | | | 192/70.12 |
| 9,638,314 B2 * | 5/2017 | Cradit | F16H 57/0434 |
| 10,167,943 B1 * | 1/2019 | Alexiou | F16H 57/0473 |
| 10,228,049 B2 * | 3/2019 | Peura | B60K 17/02 |
| 10,330,189 B2 * | 6/2019 | Drill | F16D 13/52 |
| 10,663,057 B2 * | 5/2020 | Reeves | F16H 57/0473 |
| 10,710,453 B2 * | 7/2020 | Ryman | B60K 23/0808 |
| 10,753,405 B2 * | 8/2020 | Putzer | F16D 13/74 |
| 2007/0081438 A1 | 4/2007 | Haddad et al. | |
| 2017/0241486 A1 | 8/2017 | Pritchard et al. | |
| 2018/0010682 A1 | 1/2018 | Pritchard et al. | |

\* cited by examiner

POWER TRANSMITTING COMPONENT WITH A LUBRICATION DISTRIBUTION VALVE HOUSED IN A CLUTCH HUB OF A FRICTION CLUTCH AND AN ACTUATOR FOR COORDINATED OPERATION OF THE FRICTION CLUTCH AND THE LUBRICATION DISTRIBUTION VALVE

CROSS-REFERENCE TO RELATED APPLICATIONS

This application claims the benefit of U.S. Patent Application No. 62/640,679 filed on Mar. 9, 2018, the disclosure of which is herein incorporated by reference in its entirety.

FIELD

The present disclosure relates to a power transmitting component having a lubrication distribution valve, which is housed in a clutch hub of a friction clutch, and an actuator for coordinating the operation of the friction clutch and the lubrication distribution valve.

BACKGROUND

This section provides background information related to the present disclosure which is not necessarily prior art.

In the field of vehicle drivetrain components, a transfer case is an apparatus that distributes driving power to more than one driven axle of the vehicle. A typical transfer case receives driving power from the transmission of the vehicle and transfers that power to a primary output shaft. The primary output shaft is driven generally constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

Oil may be provided to the clutch, for example, to cool the clutch that engages the secondary output shaft. However, when the clutch is not engaged and the secondary output shaft is not driven, a continued supply of oil can create drag or friction (e.g., due to shearing of the oil between plates of the clutch) on the primary output shaft, which can reduce efficiency of the vehicle. It would, therefore, be advantageous to provide a transfer case in which oil is selectively provided to the clutch when needed.

SUMMARY

This section provides a general summary of the disclosure, and is not a comprehensive disclosure of its full scope or all of its features.

A power transmitting component that includes a clutch, a ball ramp mechanism and a valve. The clutch has a hub, which is rotatable about an axis, a housing, a clutch pack and an apply plate. The housing has an annular wall and an annular flange that is coupled to the annular wall. The clutch pack has a first set of friction plates, which are axially slidably but non-rotatably coupled to the annular flange, and a second set of friction plates that are interleaved with the first set of friction plates and axially slidably but non-rotatably coupled to the hub. The apply plate is axially slidably but non-rotatably coupled to the annular flange and abuts the clutch pack on an axial end of the clutch pack that is opposite the annular wall. The ball ramp mechanism has first and second ball ramp rings and a plurality of balls. One or both of the first and second ball ramp rings has a plurality of tapered grooves into which the balls are received. The second ball ramp ring is coupled to the hub of the clutch for rotation therewith. Movement of the second ball ramp ring along the rotary axis in a direction away from the first ball ramp ring causes corresponding translation of the apply plate to thereby compress the clutch pack. The first ball ramp ring is rotatable relative to the second ball ramp ring between a first rotational position, in which the first and second ball ramp rings are spaced apart by a first distance, and a second rotational position in which the first and second ball ramp rings are spaced apart by a second distance that is greater than the first distance. The valve has a valve element, an inlet and an outlet. The valve element is received in a bore in the hub, and both the inlet and the outlet intersect the bore. The valve element is movable along the rotary axis between a first valve element position and a second valve element position. The valve element extends through the second ball ramp ring and engages the first ball ramp ring. Rotation of the first ball ramp ring from the first rotational position to the second rotational position causes movement of the valve element from the first valve element position to the second valve element position. A first fluid flow rate through the valve when the valve element is in the first valve element position is less than a second fluid flow rate through the valve when the valve element is in the second valve position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
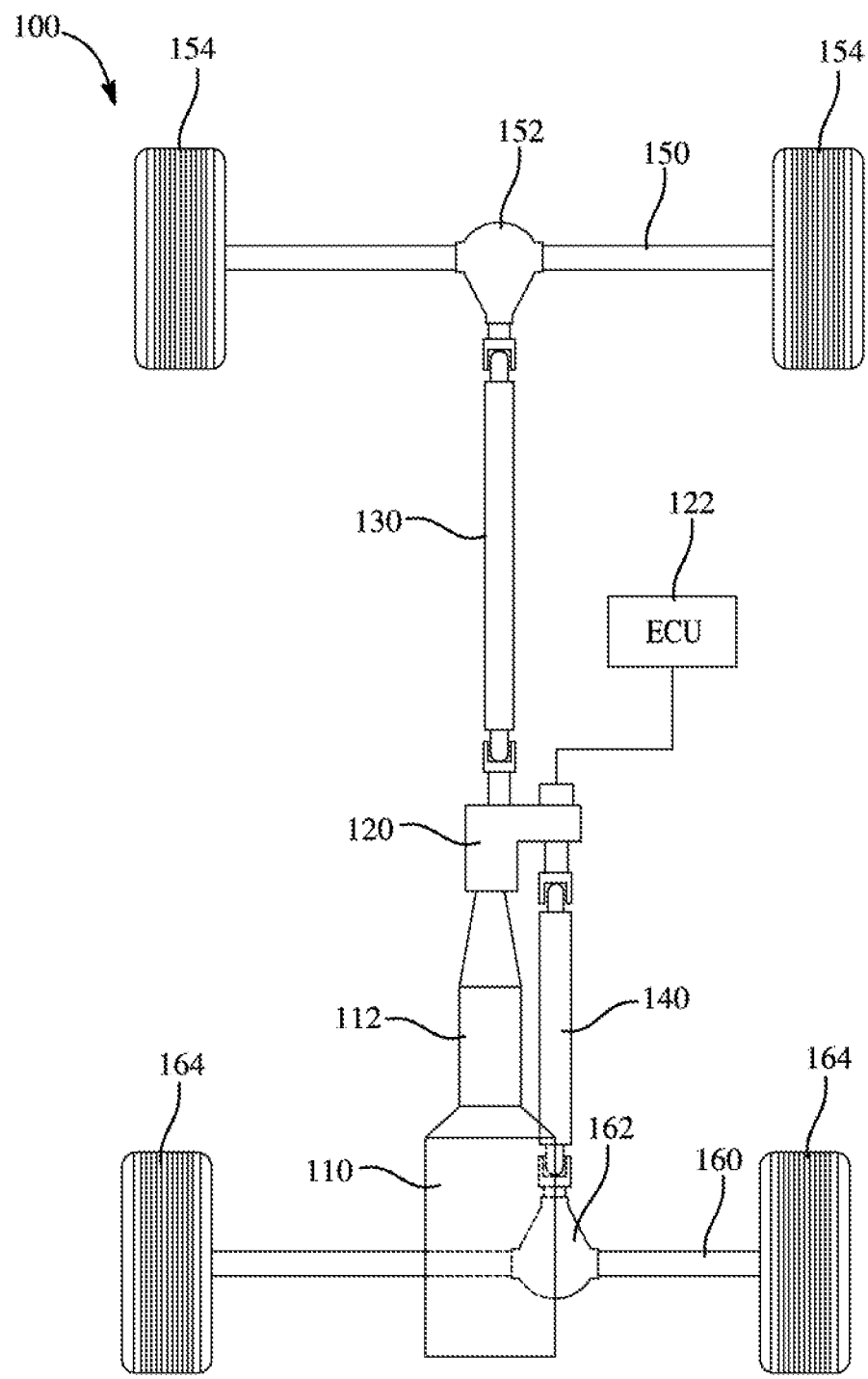
FIG. 1 is a schematic view of a vehicle having a drivetrain that includes a an exemplary power transmitting component constructed in accordance with the teachings of the present disclosure, the exemplary power transmitting component being a transfer case in the example provided.

FIG. 1 is a schematic view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case 120 to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft, and the front driveshaft 140 is the secondary driveshaft. In other implementations, the front driveshaft 140 is the primary driveshaft, and the rear driveshaft 130 is the secondary driveshaft, wherein the transfer case 120 performs a mode shift between a front-wheel drive mode and a four-wheel drive mode.

The transfer case 120 can allow a range shift that selectively provides gear reduction to the rotational output of the transfer case 120. For example, the transfer case 120 can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically, such as by a driver-operated lever that is mechanically connected to a component of the transfer case 120.

The rear driveshaft 130 provides driving power to a rear axle 150 via a rear differential 152. The rear axle 150 can be, for example, a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a pair of independent half axles. The front axle 160 provides driving power to a pair of front wheels 164 that are fitted with tires.

Figure 2:
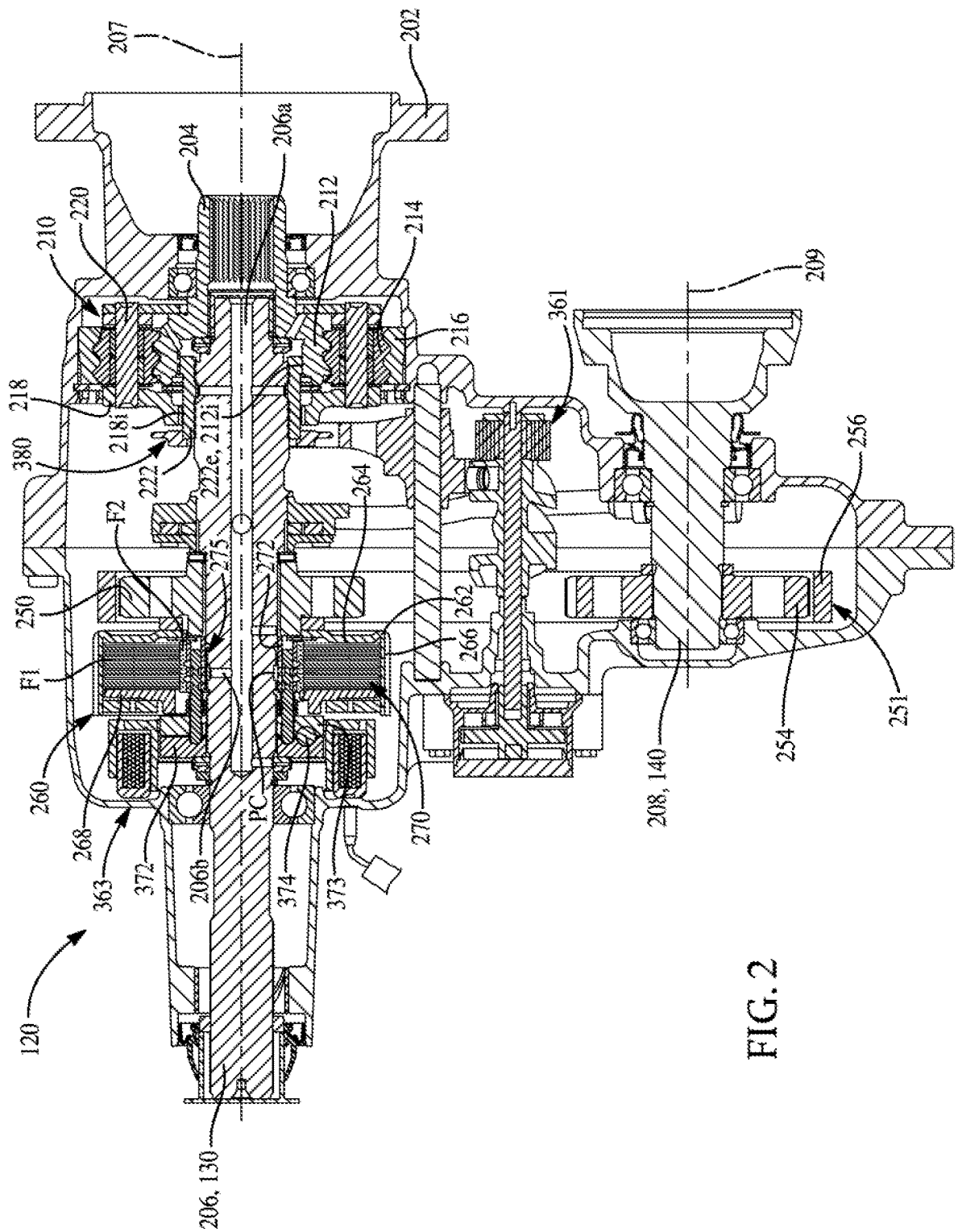
FIG. 2 is a longitudinal cross-section of the transfer case.
Figure 3:
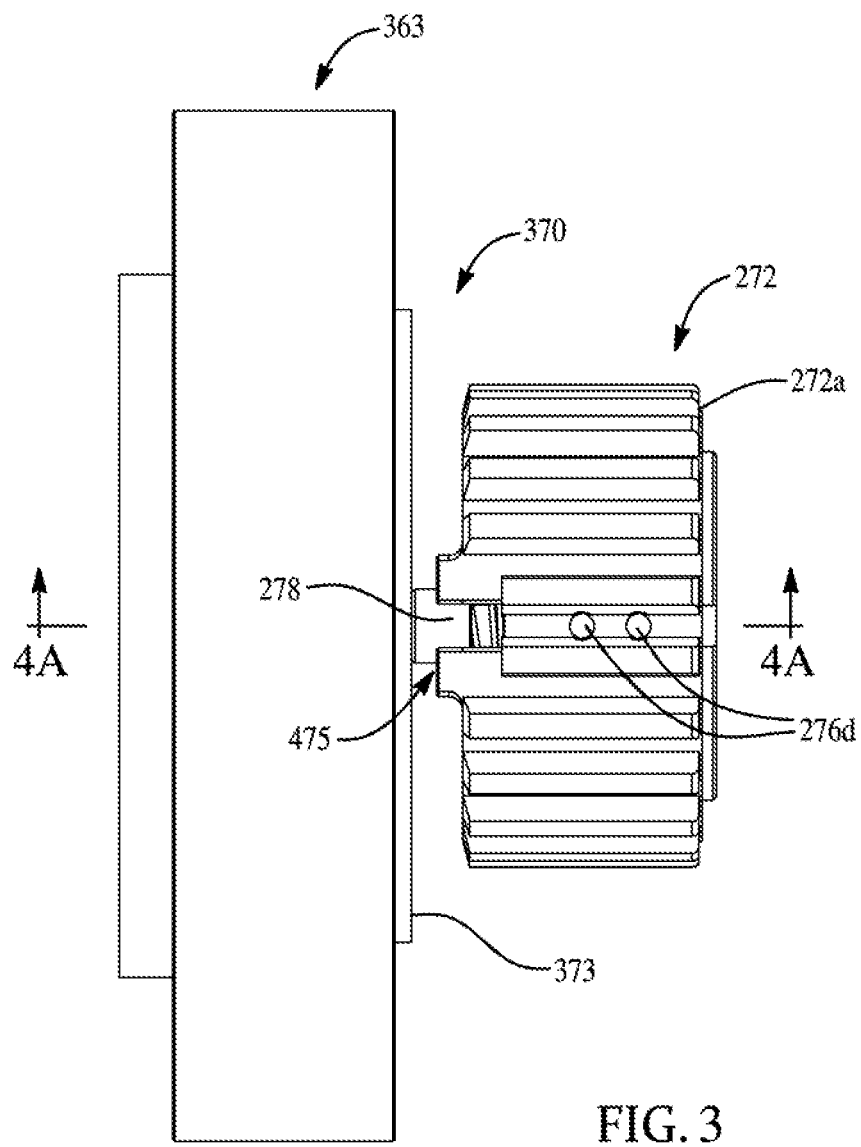
FIG. 3 is a plan view of a portion of the transfer case illustrating a mode actuator, a clutch hub and a valve.

As shown in FIG. 2, the transfer case 120 can include a gear reduction system or mechanism 210 and a secondary torque transfer system or mechanism 251. The gear reduction system 210 is configured to transfer torque selectively at different drive ratios from an input shaft 204 to a primary output shaft 206 and is operable by a range actuator 380. The secondary torque transfer mechanism 251 is configured to selectively transfer torque between the primary output shaft 206 (e.g., the rear output or drive shaft 130) and a secondary output shaft 208 (e.g., the front output shaft 140), and is operable by a torque transfer actuation mechanism 370. In the discussion that follows, directional terminology (e.g., front, forward, back, rearward, etc.) generally refers to an orientation in which the transfer case 120 might be installed in a vehicle (e.g., in the cross-sections shown in FIG. 2, the left side is the front of the transfer case 120, while the right side is the rear of the transfer case 120). However, such directional terminology is for reference only, as other mounting orientations of the transfer case 120 are possible. Furthermore, in some embodiments of the transfer case 120, the gear reduction system 210 and the range actuator 380 may be omitted.

The transfer case 120 includes a housing 202 and rotating components, which include the input shaft 204, the primary output shaft 206, and the secondary output shaft 208 that each extend out of and rotate relative to the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft 206 either directly or via a gear reduction mechanism 210. The gear reduction mechanism 210 can be a Ravigneaux planetary gearset that includes a sun gear 212 formed on or connected to the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch mechanism having a gear reduction hub 222 is utilized to selectively and couple the primary output shaft 206 to the sun gear 212 of the gear reduction mechanism 210 or to the planet carrier 218 of the gear reduction mechanism 210. The gear reduction hub 222 is slidably disposed on the primary output shaft 206 for movement along the first axis 207 between a first position and a second position. The gear reduction hub 222 has a plurality of internal teeth (not shown), which are meshingly engaged to external teeth (not shown) formed on the primary output shaft 206 to thereby axially slidably but non-rotatably couple the gear reduction hub 222 to the primary output shaft 206. The gear reduction hub 222 also includes a plurality of external teeth 222e. In the first position, which is shown in FIG. 2, the gear reduction hub 222 is positioned axially forward such that the external teeth 222e on the gear reduction hub 222 engage internal teeth 212i formed on the sun gear 212 to thereby establish a 1:1 drive ratio in the gear reduction mechanism 210. When positioned in the second position, the gear reduction hub 222 is shifted axially rearward away from the first position, and the external teeth 222e on the gear reduction hub 222 engage internal teeth 218i formed on the planet carrier 218 to thereby cause the gear reduction mechanism 210 to operate at a predetermined gear reduction so that the primary output shaft 206 is driven at a relatively lower rotational speed than the input shaft 204.

An actuator system 361 is configured to move the reduction hub 222 of the gear reduction mechanism 210 between its first (i.e., forward) and second (i.e., rearward positions). The actuator system 361 includes the range actuator 380 and can be configured in a conventional and well known manner.

The secondary torque transfer mechanism 251 is configured to transfer torque from the primary output shaft 206 to the secondary output shaft 208. As shown, the secondary torque transfer mechanism 251 is a chain drive that includes a first sprocket 250, a second sprocket 254, a chain 256, and a plate or friction clutch 260. The first sprocket 250 (e.g., rotating member) is arranged around the primary output shaft 206 and is selectively rotationally coupled to the primary output shaft 206 by the plate clutch 260. The second sprocket 254 is arranged on the secondary output shaft 208 and is fixedly rotationally coupled thereto. The chain 256 is disposed about and engages the first and second sprockets 250 and 254 so that rotation of the first sprocket 250 will cause movement of the chain 256 that drives the second sprocket 254. Alternatively, the secondary torque transfer mechanism 251 may be gear-driven (e.g., having gears, instead of the sprockets and the chain, associated with each of the primary output shaft 206 and the secondary output shaft 208 that transfer torque to each other directly or with an intermediate gear). The transfer case 120 may also be considered a power transmitting component, and the various systems and mechanisms described herein (e.g., torque transfer mechanism, clutch, lubrication system, etc.) may be incorporated in other types of power transmitting components, such as friction clutches, power transfer units, and limited slip differentials.

The clutch 260 is configured to selectively transfer torque between the primary output shaft 206 and the first sprocket 250 to thereby drive the secondary output shaft 208 via the chain 256 and the second sprocket 254. The plate clutch 260 generally includes a housing 262 (e.g., drum), a clutch hub 272, an apply plate 268 (e.g., pressure plate), and a clutch pack 270 having a first set of friction plates F1, which are axially slidably but non-rotatably coupled to the housing 262, and a second set of friction plates F2 that are interleaved with the friction plates of the first set of friction plates F1 and axially slidably but non-rotatably coupled to the clutch hub 272. The housing 262 is non-rotatably coupled to the first sprocket 250. The clutch hub 272 is non-rotatably coupled to the primary output shaft 206. The apply plate 268 is axially slidably but non-rotatably coupled to the housing 262 and is configured to compress the clutch pack 270 (and thereby frictionally engage the first and second friction plates to one another) against an annular wall 264 of the housing 262.

The housing 262 forms a substantially cylindrical cavity that contains the clutch pack 270. The primary output shaft 206 also extends through the cylindrical cavity and can rotate independently of the housing 262. The annular wall 264 of the housing 262 extends radially outward away from the primary output shaft 206 and is fixedly coupled to the first sprocket 250. The housing 262 includes an annular flange 266 that is coupled to the annular wall 264. The annular flange 266 has an internally splined configuration onto which the first set of friction plates are axially but non-rotatably mounted.

With reference to FIGS. 2 through 4A, the hub 272 is an annular member having a splined outer periphery 272a and a splined inner periphery 272b. The second set of friction plates F2 of the clutch pack 270 have an inner periphery (not labeled) having a plurality of corresponding splines (e.g., inner plate splines; not labeled), which engage the splined outer periphery 272a of the hub 272.

The primary output shaft 206 includes a plurality of corresponding splines (e.g., outer shaft splines; not labeled), which engage the splined inner periphery 272b of the hub 272 to transfer torque therebetween. The hub 272 can be fixed or held in place axially on the primary output shaft 206. Movement of the apply plate 268 toward the annular wall 264 compresses the clutch pack 270 to frictionally engage the first and second sets of friction plates F1 and F2 with one another. Movement of the apply plate 268 along the first axis 207 is controlled by a mode actuator 363. The apply plate 268 can be positioned in a first or forward position, in which the apply plate 268 is spaced apart from the annular wall 264 by a first distance, and a second or rearward position in which the apply plate 268 is spaced from the annular wall 264 by a second distance that is relatively smaller than the first distance.

With reference to FIGS. 4A through 6, the mode actuator 363 includes a ball ramp mechanism 370 having a first ball ramp ring 372, a second ball ramp ring 373, which axially abuts the apply plate 268, and a plurality of balls 374. The first and second ball ramp rings 372 and 373 define tapered grooves 376 and 378, respectively, into which the balls 374 are received. The first and second ball ramp rings 372 and 373 are rotatable relative to one another between a first rotational position, in which the balls 374 are received in relatively deeper portions of the tapered grooves 376 and 378, and a second rotational position in which the balls 374 are received in relatively shallower portions of the tapered grooves 376 and 378. In the example provided, the first ball ramp ring 372 is configured to rotate about the axis 207 relative to the primary output shaft 206, while the second ball ramp ring 373 is configured to both slide on and rotate with the primary output shaft 206. In the example provided, the second ball ramp ring 373 has an internally splined aperture that is matingly received on the externally splined segment of the primary output shaft 206 to which the clutch hub 272 is non-rotatably coupled. Ordinarily, the first ball ramp ring 372 will tend to rotate with the second ball ramp ring 373 and the balls 374 will tend to move into relatively deeper portions of the tapered grooves 376 and 378 in the first and second ball ramp rings 372 and 373, which spaces the second ball ramp ring 373 relatively close to the first ball ramp ring 372 and permits the apply plate 268 to move away from the annular wall 264 so that the clutch pack 270 is not compressed. An electromagnetic coil EC can be employed to generate a magnetic field that can interact with teeth T that are formed on and extend radially outwardly from the first ball ramp ring 372 to apply a force or torque to the first ball ramp ring 372 that resists rotation of the first ball ramp ring 372 relative to the primary output shaft 206. The force or torque acting on the first ball ramp ring 206 effectively brakes (slows rotation) of the first ball ramp ring 372 relative to the second ball ramp ring 373, causing the balls 374 to move into shallower portions of the tapered grooves 376 and 378 and urge the second ball ramp ring 373 away from the first ball ramp ring 372 along the axis 207. It will be appreciated that movement of the second ball ramp ring 373 along the axis 207 away from the first ball ramp ring 372 will cause corresponding motion of the apply plate 268 along the axis 207 toward the annular wall 264, which compresses the clutch pack 270. It will also be appreciated that the magnetic field produced by the electromagnetic coil EC can be varied to vary the torque or force that is applied to the first ball ramp ring 372, thereby controlling the amount by which the first ball ramp ring 372 can be rotated relative to (and translated axially away from) the second ball ramp ring 373.

The transfer case 120 is configured to selectively provide oil to the clutch 260. For example, oil may be supplied to the clutch 260 when needed for cooling, such as when the clutch 260 is or is being engaged (i.e., when the clutch pack 270 is or is being compressed between the apply plate 268 and the annular wall 264). The supply of oil to the clutch 260 can be reduced or eliminated when the clutch 260 is disengaged (i.e., when the clutch pack 270 is not compressed between the apply plate 268 and the annular wall 264).

Figure 4B:
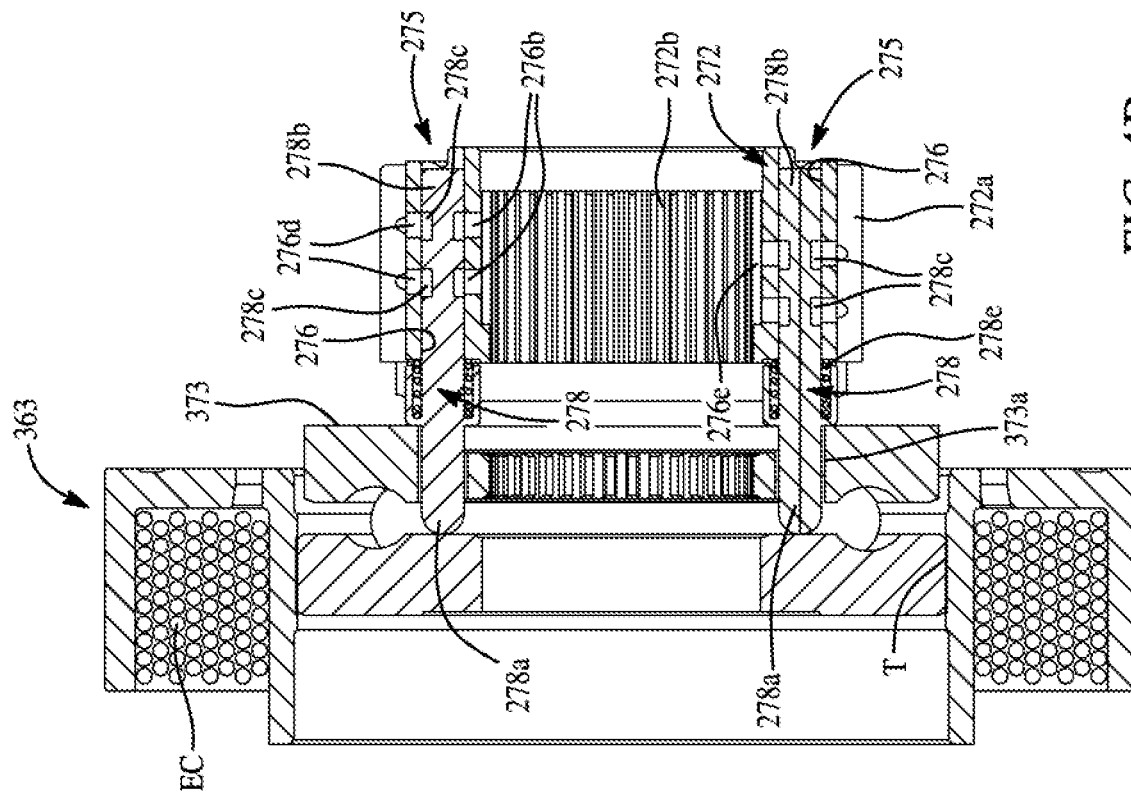
FIG. 4B is a sectional view similar to that of FIG. 4A but illustrating the first ball ramp ring of the mode actuator in a second rotational position and the valve elements of the valves in a second valve element position.
Figure 4A:
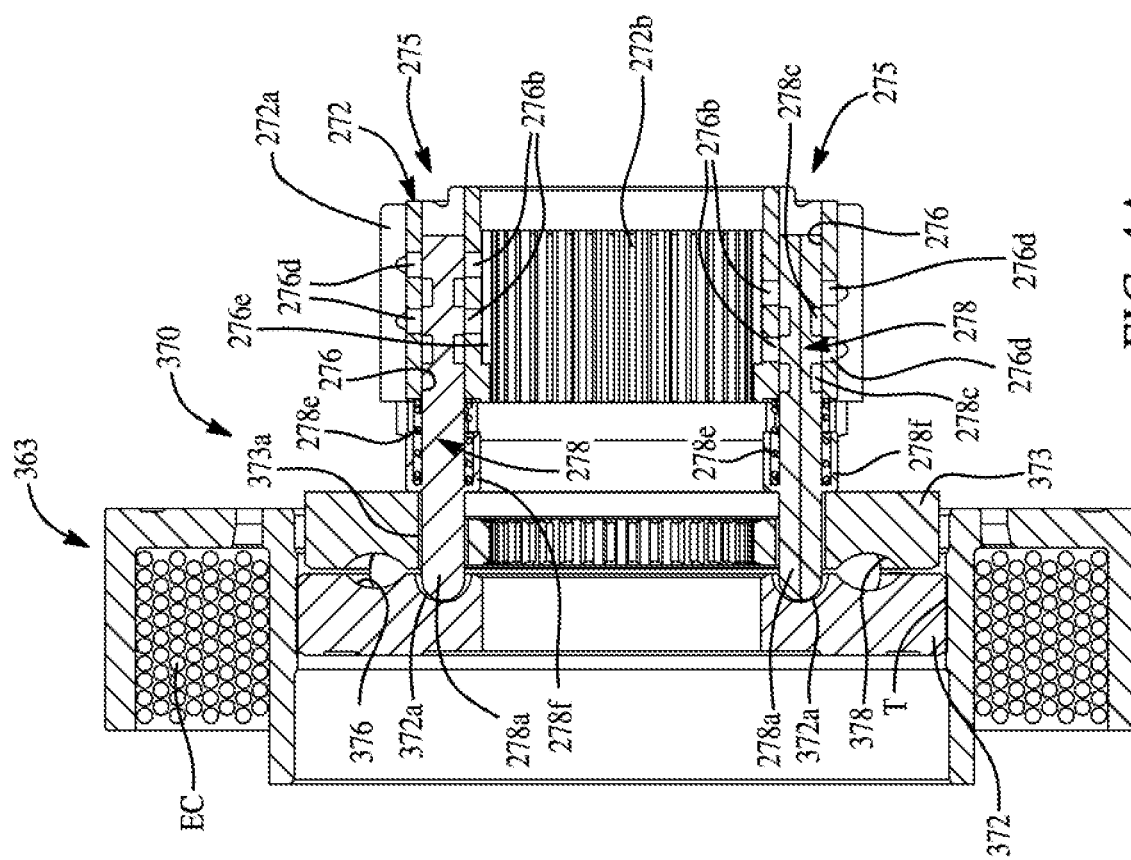
FIG. 4A is a section view taken along the line 4A-4A of FIG. 3, the view illustrating a first ball ramp ring of the mode actuator in a first rotational position and valve elements of the valves in a first valve element position.
Figure 5:
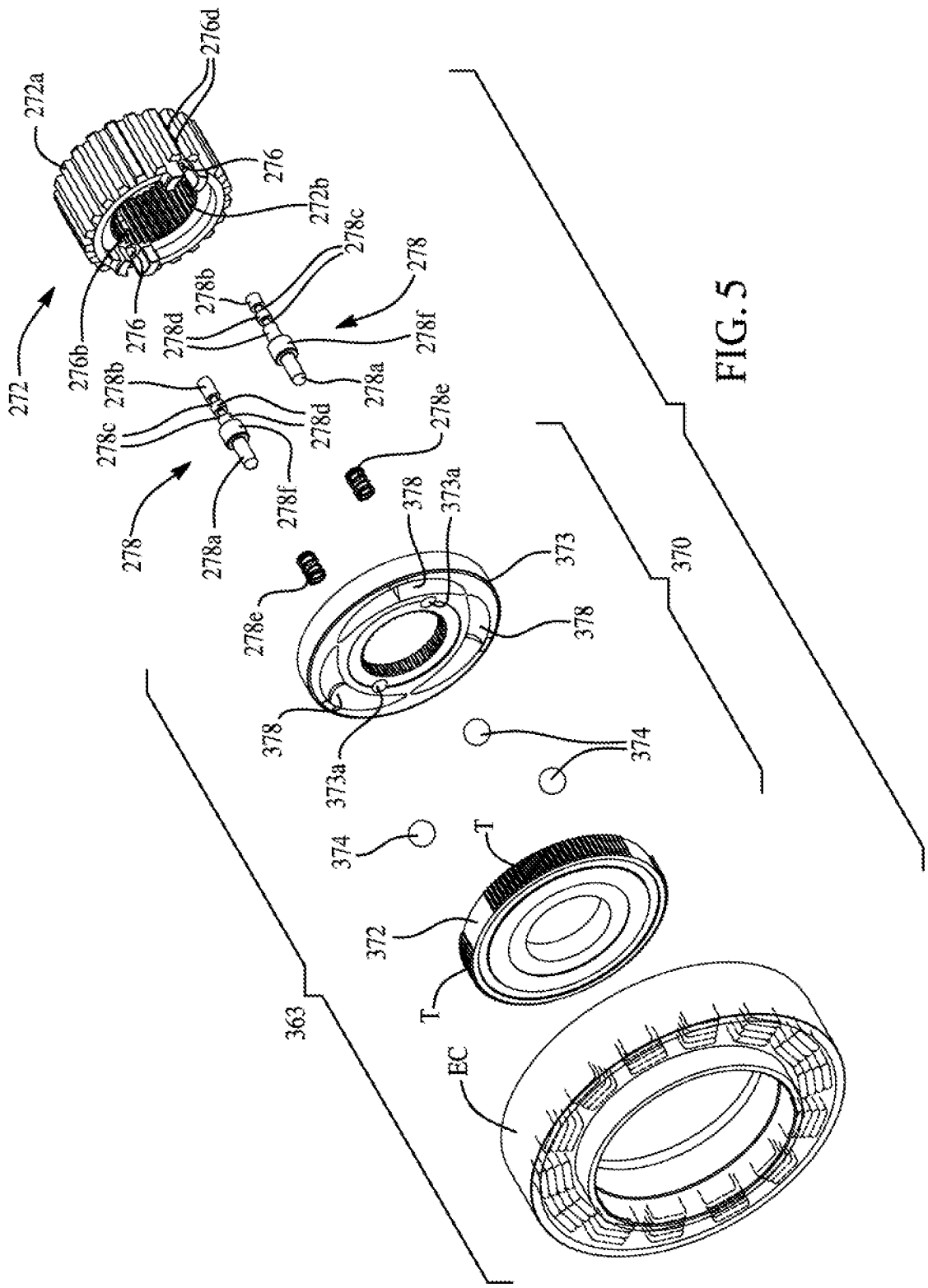
FIG. 5 is an exploded front perspective view of the mode actuator, the clutch hub and the valves.
Figure 6:
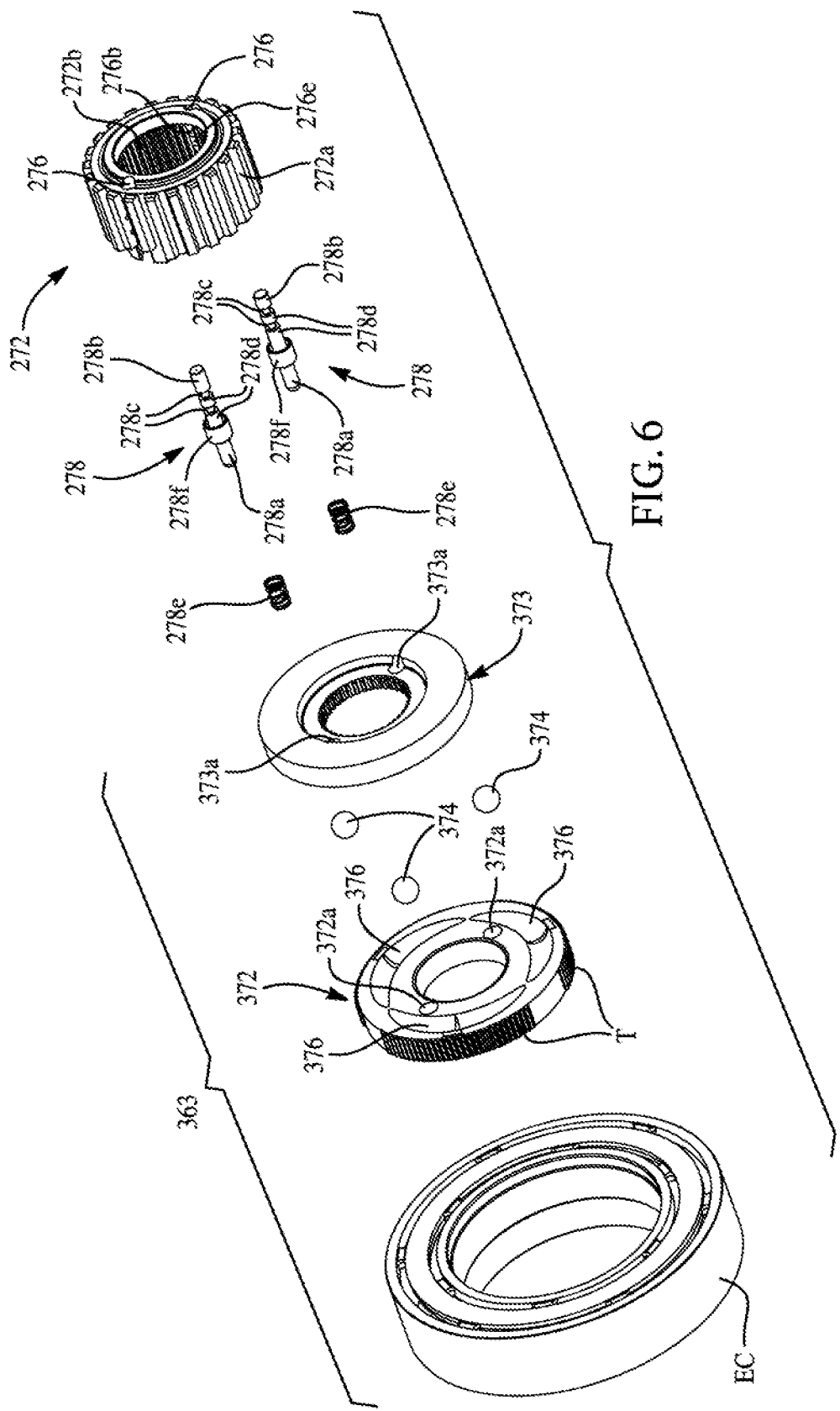
FIG. 6 is an exploded rear perspective view of the mode actuator, the clutch hub and the valves.

The transfer case 120 can include one or more valves 275 that are configured to selectively supply oil to the clutch 260. The valve(s) 275 is/are incorporated into the hub 272 and is/are configured to receive oil supplied through the primary output shaft 206 and to selectively release the oil into the clutch housing 262 of the clutch 260. More particularly, and as will be described in detail below, the valves 275 are operated by the rotation of the first ball ramp ring 372 relative to the second ball ramp ring 373 as the clutch pack 270 is compressed or released. Since axial movement of both the apply plate 268 and the valves 275 is controlled through rotational movement of the first ball ramp ring 372 relative to the second ball ramp ring 373, the mode actuator 363 simultaneously operates both the torque transfer mechanism 251 (e.g., the clutch 260 thereof) and the lubrication system (e.g., the valve(s) 275 thereof) as illustrated by FIGS. 4A and 4B.

The primary output shaft 206 includes a central conduit 206a (e.g., central or main channel, best shown in FIG. 2) extending axially through a center thereof, and a one or more branch conduits 206b (e.g., radial conduits, bores, or branches, best shown in FIG. 2) that are in fluidic communication with and extend radially outward from the central conduit 206a. In the example provided, two branch conduits 206b are provided that are spaced 180 degrees apart from one another. The central conduit 206a is in fluidic communication with a source of pressurized oil, such as an oil pump (not shown). The primary output shaft 206 additionally includes a peripheral channel PC (e.g., circumferential or outer channel) that extends circumferentially around the primary output shaft 206 where each branch conduit 206b intersects the outer circumferential surface of the primary output shaft 206. The peripheral channel PC forms a recess or groove between the primary output shaft 206 and the clutch hub 272 that receives oil discharged from the branch conduit(s) 206b.

Each valve 275 is configured to selectively transmit oil from the peripheral channel PC to the outer periphery of the hub 272. The valves 275 are positioned at circumferential locations about the hub 272. For example, the hub 272 may include two valves 275 that are spaced circumferentially about the hub 272 at desired locations, such as 180 degrees apart from one another. Equal or even circumferential spacing of the valves 275 may be desirable in some instances for rotational balancing of the hub 272.

Each valve 275 can be configured as a spool valve and can include a bore 276 (e.g., cylinder), which can be formed axially through the hub 272, and a valve rod or element 278 that can be slidably received in the bore 276. The valve element 278 is movable between a first valve element position (shown in FIG. 4A), and a second valve element position (shown in FIG. 4B). In the example provided, the first valve element position is a closed position that inhibits fluid flow through the valve 475 (i.e., a flow rate of zero), while the second valve element position is a fully open position that permits maximum fluid flow through the valve 475. It will be appreciated, however, that the first valve position could be configured to permit some fluid flow through the valve 475 (e.g., a non-zero flow rate that is substantially less than the flow rate that would be provided when the valve element 278 is in the second valve element position).

One or more inlets 276b (e.g., inlet ports; e.g., three as shown), and one or more outlets 276d (e.g., outlet port; e.g., three as shown) can be formed in the hub 272 and can intersect the bore 276. The inlets 276b are formed as bores that extend in a radial direction from the inner periphery 272b of the hub 272 to the bore 276, while the outlets 276d are formed as bores that are aligned with the inlets 276b and which extend in a radial direction from the bore 276 to the outer periphery 272b of the hub 272. Oil flows radially outward from the peripheral channel 206d of the primary output shaft 206 into the bore 276 of the hub 272 through the inlets 276b, into the bore 276, and out of the bore 276 through the one or more outlets 276d. According to other exemplary embodiments, the bore 276 may include fewer or more inlets 276b and/or bores 276c.

The inlets 276b and the outlets 276d may, as shown, be spaced axially relative to an axis of the bore 276. For example, the inlets 276b and the outlets 276d may be positioned at different axial positions (e.g., distances) relative to the peripheral channel 206d of the primary output shaft 206. To help distribute oil in an axial direction from the peripheral channel 206d of the primary output shaft 206, the hub 272 may not include inner splines 272d at the circumferential position corresponding to the inlets 276b and the outlets 276d (see FIG. 5). The splines of the primary output shaft 206, thereby, define radially therebetween one or more axially extending channels 272e (e.g., axial channels, FIG. 4A, 4B) therebetween. The axial channels 272e are in fluidic communication with the branch conduits 206b, which are not blocked by inner splines 272d of the hub 272 and allow oil to pass from the peripheral channel 206d of the primary output shaft 206 in axial directions to the inlets 276b axially offset from the peripheral channel 206d. That is, the axial channels 272e allow the inlets 276b of the bore 276 to be in fluidic communication with each other external to the bore 276.

The valve element 278 is configured to slide within an associated one of the bores 276 in the hub 272 between the first and second valve element positions. The valve element 278 can be a substantially cylindrical, elongated member that includes a forward end 278a, a rearward end 278b, one or more grooves 278c (e.g., two as shown), and two or more lands 278d (e.g., three as shown) on either side of and between the grooves 278c. The grooves 278c extend around the outer periphery of the valve element 278 to provide a flow path between the lands 278d in a radial direction out of the bore 276. The forward end 278a of the valve element 278 is configured to extend through a clearance whole 373a in the second ball ramp ring 373 and engage detent pockets 372a in the first ball ramp ring 372. In the example provided, each detent pocket 372a is formed with a spherical radius and that is sized to receive the forward end 278a of a corresponding one of the valve elements 278 when the balls 374 are disposed in the deepest portions of the tapered grooves 376 and 378 in the first and second ball ramp rings 372 and 373. As such, each of the valve elements 378 will be disposed in the first valve element position only when the clutch pack 270 is not compressed by the apply plate 268. It will be appreciated, however, that the detent pockets 372a could be sized and shaped differently so that more relative rotation between the first and second ball ramp rings 372 and 373 is required to transition the valve elements 378 between the first and second valve element positions. It will also be appreciated that one or more of the detent pockets 372a could be sized and/or shaped differently. A return spring 278e engages an intermediate portion 278c of the valve element 278 and biases the valve element 278 axially toward the first ball ramp ring 372. An intermediate portion 278f of the valve element 278 is configured to receive the return spring 278e, which bears against a shoulder of the intermediate portion 278f and a surface of the hub 272 to bias the valve element 278 toward the first ball ramp ring 372.

When the valve elements 278 are in the first valve element position, the lands 278d are aligned with the inlets 276b and the outlets 276d in the hub 272 to inhibit fluid flow through the valves 475. As shown in FIG. 4B, when the valve elements 278 are in the second valve element position, the grooves 278c are instead aligned with the inlets 276b and the outlets 276d in the hub 272 to permit fluid flow through the valves 475.

When the electromagnetic coil EC is not powered so that the clutch 260 is disengaged, the apply plate 268 is displaced axially away from the clutch pack 270 (e.g., by 1-2 mm) and the forward end 278a of the valve elements 278 are received in the detent pockets 372a in the first ball ramp ring 372. In this position, the lands 278d of the valve element 278 are aligned with the inlets 276b and the outlets 276d of the bore 276 of the hub 272, so as to close the valves 275.

When the electromagnetic coil EC is operated to generate a magnetic field that is sufficiently strong to cause rotation of the first ball ramp ring 372 relative to the second ball ramp ring 373 that causes the balls 374 travel along the opposing tapered grooves 376 and 378 on the first and second ball ramp rings 372 and 373 and urge the second ball ramp ring 373 axially away from the first ball ramp ring 372, the axial movement of second ball ramp ring 373 will cause corresponding movement of the apply plate 268, causing the apply plate to compress the clutch pack 270 to engage the clutch 260. Simultaneously, rotation of the first ball ramp ring 372 moves the forward end 278a of the valve element 278 out of the detent pockets 372a in an axially rearward direction (i.e., toward the first sprocket 250) so that the grooves 278c of the valve element 278 are aligned with the inlets 276b and the outlets 276d in the hub 272 and permit fluid flow through the valves 475.

When the clutch 260 is fully engaged, the apply plate 268 maximally compresses the clutch pack 270 (i.e., between the apply plate 268 and the annular wall 264 of the clutch housing 262). The grooves 278c of the valve element 278 are aligned with the inlets 276b and the outlets 276d of the bore 276 of the hub 272, so as to keep the valves 275 open and continue to allow oil to flow therethrough.

It will be appreciated that rotation of the first ball ramp ring 372 relative to the second ball ramp ring 373 in an opposite rotational direction that positions the first ball ramp ring 372 in the first rotational position also aligns the forward ends 278a of the valve elements 278 to the detent pockets 372a. In this position, the return springs 278e drive the valve elements 378 into the first valve element position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
    a clutch having a hub, a housing, a clutch pack and an apply plate, the hub being rotatable about a rotary axis, the housing having an annular wall and an annular flange coupled to the annular wall, the clutch pack having a first set of friction plates, which are axially slidably but non-rotatably coupled to the annular flange, and a second set of friction plates that are interleaved with the first set of friction plates and axially slidably but non-rotatably coupled to the hub, the apply plate being axially slidably but non-rotatably coupled to the annular flange and abutting the clutch pack on an axial end of the clutch pack that is opposite the annular wall;
    a ball ramp mechanism having first and second ball ramp rings and a plurality of balls, at least one of the first and second ball ramp rings having a plurality of tapered grooves into which a corresponding one of the balls is received, the second ball ramp ring being coupled to the hub of the clutch for rotation therewith, wherein movement of the second ball ramp ring along the rotary axis in a direction away from the first ball ramp ring causes corresponding translation of the apply plate to thereby compress the clutch pack, and wherein the first ball ramp ring is rotatable relative to the second ball ramp ring between a first rotational position, in which the first and second ball ramp rings are spaced apart by a first distance, and a second rotational position in which the first and second ball ramp rings are spaced apart by a second distance that is greater than the first distance; and
    a valve having a valve element, an inlet and an outlet, the valve element being received in a bore in the hub, the inlet and the outlet intersecting the bore, the valve element being movable along the rotary axis between a first valve element position and a second valve element position, the valve element extending through the second ball ramp ring and engaging the first ball ramp ring, wherein rotation of the first ball ramp ring from the first rotational position to the second rotational position causes movement of the valve element from the first valve element position to the second valve element position, and wherein a first fluid flow rate through the valve when the valve element is in the first valve element position is less than a second fluid flow rate through the valve when the valve element is in the second valve element position.

2. The power transmitting component of claim 1, wherein the valve element is received in a detent pocket formed in the first ball ramp ring when the valve element is in the first valve element position.

3. The power transmitting component of claim 2, wherein the detent pocket is defined by a spherical radius.

4. The power transmitting component of claim 1, further comprising a first shaft to which the hub and the second ball ramp ring are axially slidably but non-rotatably coupled.

5. The power transmitting component of claim 4, further comprising a second shaft and a torque transfer mechanism having a first drive element, which is coupled to the housing of the clutch for rotation therewith, and a second drive element that is coupled to the second shaft for common rotation.

6. The power transmitting component of claim 5, wherein the first drive element is a first sprocket, wherein the second drive element is a second sprocket, and wherein the torque transfer mechanism further comprises a chain that is drivingly engaged to the first and second sprockets.

7. The power transmitting component of claim 1, wherein fluid communication through the valve is inhibited when the valve element is in the first valve element position.

8. The power transmitting component of claim 1, further comprising an electromagnetic coil that is selectively operable for generating a magnetic field that interacts with the first ball ramp ring to resist rotation of the first ball ramp ring about the rotary axis.

9. The power transmitting component of claim 1, wherein the outlet extends radially through the hub.

10. The power transmitting component of claim 1, wherein the valve further comprises a return spring that biases the valve element toward the first ball ramp ring.

\* \* \* \* \*